US012241589B2

(12) United States Patent
Yang

(10) Patent No.: US 12,241,589 B2
(45) Date of Patent: Mar. 4, 2025

(54) LUBRICANT INJECTOR

(71) Applicant: KLT CO., LTD., Paju-si (KR)

(72) Inventor: Tae Im Yang, Seoul (KR)

(73) Assignee: KLT CO., LTD. (KR)

( * ) Notice: Subject to any disclaimer, the term of this patent is extended or adjusted under 35 U.S.C. 154(b) by 0 days.

(21) Appl. No.: 18/602,267

(22) Filed: Mar. 12, 2024

(65) Prior Publication Data
US 2024/0318774 A1 Sep. 26, 2024

Related U.S. Application Data

(63) Continuation of application No. PCT/KR2022/011520, filed on Aug. 4, 2022.

(30) Foreign Application Priority Data

Oct. 8, 2021 (KR) ........................ 10-2021-0133695

(51) Int. Cl.
F16N 7/14 (2006.01)
(52) U.S. Cl.
CPC ...................... F16N 7/14 (2013.01)
(58) Field of Classification Search
CPC ........ F16N 7/14; F16N 11/08; F16N 2210/12; F16H 25/20; B29C 49/14
USPC .......................................................... 474/7.4
See application file for complete search history.

(56) References Cited

U.S. PATENT DOCUMENTS

| 5,732,794 | A | * | 3/1998 | Orlitzky | .................. | F16N 11/08 222/326 |
| 5,971,229 | A | * | 10/1999 | May | ........................ | F16N 11/08 222/327 |
| 6,125,969 | A | * | 10/2000 | Graf | ........................ | F16N 11/08 184/26 |
| 7,228,941 | B2 | * | 6/2007 | Weigand | ................. | F16N 11/08 184/7.4 |
| 8,251,182 | B2 | * | 8/2012 | Yang | ........................ | F16N 11/04 184/7.4 |
| 2004/0155068 | A1 | * | 8/2004 | Weigand | ................. | F16N 11/08 222/333 |

FOREIGN PATENT DOCUMENTS

| JP | 09178087 A | 7/1997 |
| KR | 101184441 B1 | 9/2012 |
| KR | 101448748 B1 | 10/2014 |
| KR | 101546379 B1 | 8/2015 |

OTHER PUBLICATIONS

International Search Report (PCT/KR2022/011520), WIPO, Jan. 20, 2023.
Korean Notice of Allowance (KR 10-2021-0133695), KIPO, Nov. 3, 2023.

* cited by examiner

*Primary Examiner* — Michael R Mansen
*Assistant Examiner* — Mark K Buse
(74) *Attorney, Agent, or Firm* — Park & Associates IP Law Office

(57) ABSTRACT

Proposed is a lubricant injector, which slowly rotates a screw shaft by maximally increasing the reduction ratio in an internal space of a provided lubricant injector having a predetermined size, and thus can increase ejection pressure.

5 Claims, 4 Drawing Sheets

LUBRICANT INJECTOR

REFERENCE TO RELATED APPLICATIONS

This is a continuation of International Patent Application PCT/KR2022/011520 filed on Aug. 4, 2022, which designates the United States and claims priority of Korean Patent Application No. 10-2021-0133695 filed on Oct. 8, 2021, the entire contents of which are incorporated herein by reference.

FIELD OF THE INVENTION

The present disclosure relates to a lubricant injector and, more particularly, to a lubricant injector that is installed in locations that require lubrication due to mechanical friction, and can automatically inject lubricating oil.

BACKGROUND OF THE INVENTION

Lubricant injectors, which are used at locations where mechanical friction occurs in general industrial machinery, have become widespread and are utilized in many industries.

A lubricant injector is a device that injects lubricating oil, or grease, and a lubricating grease is a mixture of a thickener, a base oil, and additives, in a physically combined rather than chemically combined structure. That is, the thickener acts as a sponge and the oil acts as water, and in the same way that water comes out when we squeeze a sponge containing water, when a certain pressure or stress is applied to grease, oil is automatically separated, and measuring this is called oil separation. The greater the oil separation of the grease, the easier the oil separates out.

There are two major types of lubricant injectors depending on how pressure is applied to grease to discharge the grease.

One is a gas discharge method, in which a generated gas pressurizes a piston at a constant rate, and grease is discharged by the pressure. The problem is that, when pressurization by such gas is carried out consistently for a long period of time, from at least a month to up to a year, oil in the grease is separated and the oil gradually escapes from a container, and at some point, only a thickener remains and hardens in the container like a mud, reaching a point where the thickener can no longer be pushed out with the pressure of the gas. This creates misunderstanding that the grease is left inside the container, which leads to the grease being left unattended, and resulting in damage to a bearing.

One of the mechanical discharge methods developed to overcome the above-mentioned drawbacks of the gas type is a screw down method.

A lubricant injector of the screw down type boasts a simple structure, enables reliable discharge, and has a comparative advantage in terms of oil separation, but has limitations due to low pressurization, that is, grease ejection pressure.

An example of related art following the above-described screw down-type structure is disclosed in U.S. Pat. No. 7,228,941 B2, in which due to the rotation of a gearwheel, a wedge-shaped sliding surface attached to the lower part of the gearwheel rotates, bringing about up-and-down movements of a ram along a wedge-shaped associated surface at the bottom of the sliding surface, which is connected to the ram, so that grease is pressurized and discharged according to the up-and-down movements of the ram. The disadvantages of this conventional case are that the structure is very complicated, the production cost is high, and the battery consumption is high.

An injector product developed to overcome the problems of the screw down type is a positive displacement type. In this method, a pump is connected to a small motor to suck in and pressurize grease to obtain higher pressure. While this method has the great advantage of achieving high ejection pressure, because a spring that presses grease so that the grease is smoothly injected from the top into a pump inlet continuously presses the grease, at some point, as in the case of gas type, oil separation begins to occur. When oil separation occurs, the fluidity of the grease decreases and suction through the pump does not work smoothly, causing the inlet to become clogged and discharging to stop.

In order to solve the problems of the related art, there is Korean Patent No. 10-1546379, a lubricant injector applied for and registered by the present applicant, in which ejection and pumping of lubricating oil may be performed simultaneously using a single power source, and a clutch function is provided to overcome pressure changes caused by differences in the flow amount of lubricating oil.

FIG. 1 shows the lubricant injector disclosed in Korean Patent No. 10-1546379. As shown, the lubricant injector is equipped with a reducer 220 interlocked with a drive motor 210, and a pinion 230 is decelerated and rotated by the reducer 220.

As the pinion 230 rotates, a cylindrical cam 310 gear-coupled to the pinion 230 rotates, and as a result, lubricating oil is pressurized by a piston linked to a screw shaft 130 and flows into the cylindrical cam. The inflowed lubricating oil is pressurized by a plunger 320, which moves up and down according to the cylindrical cam set trajectory, and is discharged to a target location, and stable pumping is possible by blocking a backpressure generated by the lubricating oil discharged with a check valve, thereby reducing oil separation caused by pressurizing lubricating oil for a long period of time as well as overcoming the disadvantage of low ejection pressure of the screw down method.

However, since the above lubricant injector is designed to perform both ejection and pumping of lubricating oil using a single power source, the operating mechanism is complicated, the number of components is rather large, making the production cost high, and maintenance is difficult in case of failure.

Moreover, even if the reducer 220 is used, there is a limit to the size of the internal space of a given lubricant injector to increase the reduction ratio, and it is difficult to rotate the screw shaft strongly with such a gear structure in combination with a pinion.

Accordingly, there is a need to develop a technology for overcoming the shortcomings of low ejection pressure of the screw down method by strongly rotating a screw shaft while also offering a structure that can be operated with a simple mechanism.

(Patent Document 0001) U.S. Pat. No. 7,228,941 (published Aug. 12, 2004)

(Patent Document 0002) Korean Patent No. 10-1546379 (registered Aug. 17, 2015)

SUMMARY OF THE INVENTION

The present disclosure is intended to solve the above problems occurring in the related art. An objective of the present disclosure is to provide a lubricant injector, which slowly rotates a screw shaft by maximally increasing the reduction ratio in an internal space of a provided lubricant injector with a predetermined size, and thus can increase ejection pressure.

In addition, an objective of the present disclosure is to provide a lubricant injector that operates with a simple mechanism, has a low production cost due to a small number of components, and is easy to maintain.

Furthermore, an objective of the present disclosure is to provide a lubricant injector with excellent assembly ability by simply and firmly fastening a storage chamber and a main body located at the bottom of the storage chamber using only a ring-shaped locking member.

Other objectives and advantageous effects of the present disclosure will be explained below, and it should be added that the other objectives and advantages of the present disclosure will be encompassed in a wider scope not only by the matters described in the claims of the present disclosure and the disclosure of the embodiments, but also by means and combinations within the scope that can be easily derived from these.

In order to achieve the above mentioned objectives, there is provided a lubricant injector including: a storage chamber configured to be filled with lubricating oil; a piston provided inside the storage chamber; a screw shaft that is coupled to the piston, and raises and lowers the piston as the screw shaft rotates; a main body located under the storage chamber; a drive motor that is accommodated within the main body and drives the screw shaft; and a discharge conduit for discharging the lubricating oil to outside, wherein the screw shaft may have a head portion at a lower end thereof, may be rotatably mounted through the storage chamber, and may have an inlet hole on a lower side thereof and an outlet hole on a bottom of the head portion, which communicate with each other through an internal flow passage, and a power transmission member may be provided between the screw shaft and the discharge conduit, wherein the power transmission member may include: a circular plate having an upper coupler on an upper surface thereof that is fixedly coupled to the head portion of the screw shaft, and a lower coupler on a lower surface thereof that is rotatably coupled to an upper side of the discharge conduit; a ring gear provided on a bottom surface of an edge of the circular plate; and a through hole passing through the upper coupler and the lower coupler, and the power transmission member may be rotatably coupled by a pinion linked to the drive motor to transmit rotational force to the screw shaft.

In addition, according to a preferred embodiment of the present disclosure, an insertion duct, on a lower surface of the storage chamber, coupled to the upper coupler may be further included.

In addition, the head portion may be provided in a polygonal shape or sawtooth shape, and the upper coupler fixedly coupled to the head portion may be provided in a corresponding shape.

In addition, the ring gear may be detachably coupled to the circular plate or may be injection molded integrally with the circular plate.

In addition, a ring-shaped locking member configured to secure the storage chamber and the main body to each other may be further included.

According the present disclosure, the following effects can be expected:

First of all, it is possible to pressurize lubricating oil for a long period of time by increasing the reduction ratio as much as possible within the internal space of a given lubricant injector of a predetermined size and rotating a screw shaft slowly.

In addition, it is possible to overcome the disadvantage of low ejection pressure since a ring gear is provided at the edge of a circular plate so as to rotate by means of a pinion, and a screw shaft is fixedly coupled to the center of the upper surface of the rotating circular plate, so that the screw shaft can be reliably rotated even with a small rotational force of the pinion.

Furthermore, since a lubricant injector of the present disclosure can be operated with a simple mechanism, the production cost is low due to a small number of components, maintenance is easy, and assembly ability is excellent as simple and sturdy fastening is possible with only a locking member.

It should be added that other advantageous effects of the present disclosure will be encompassed in a broader scope by the effects that can occur from the embodiments described above and the matters described in the claims of the present disclosure, and within the scope that can be easily derived from these, and by the possibilities of potential advantages contributing to industrial development.

DETAILED DESCRIPTION OF THE INVENTION

Hereinafter, preferred embodiments according to the present disclosure will be described with reference to the attached drawings.

Figure 1:
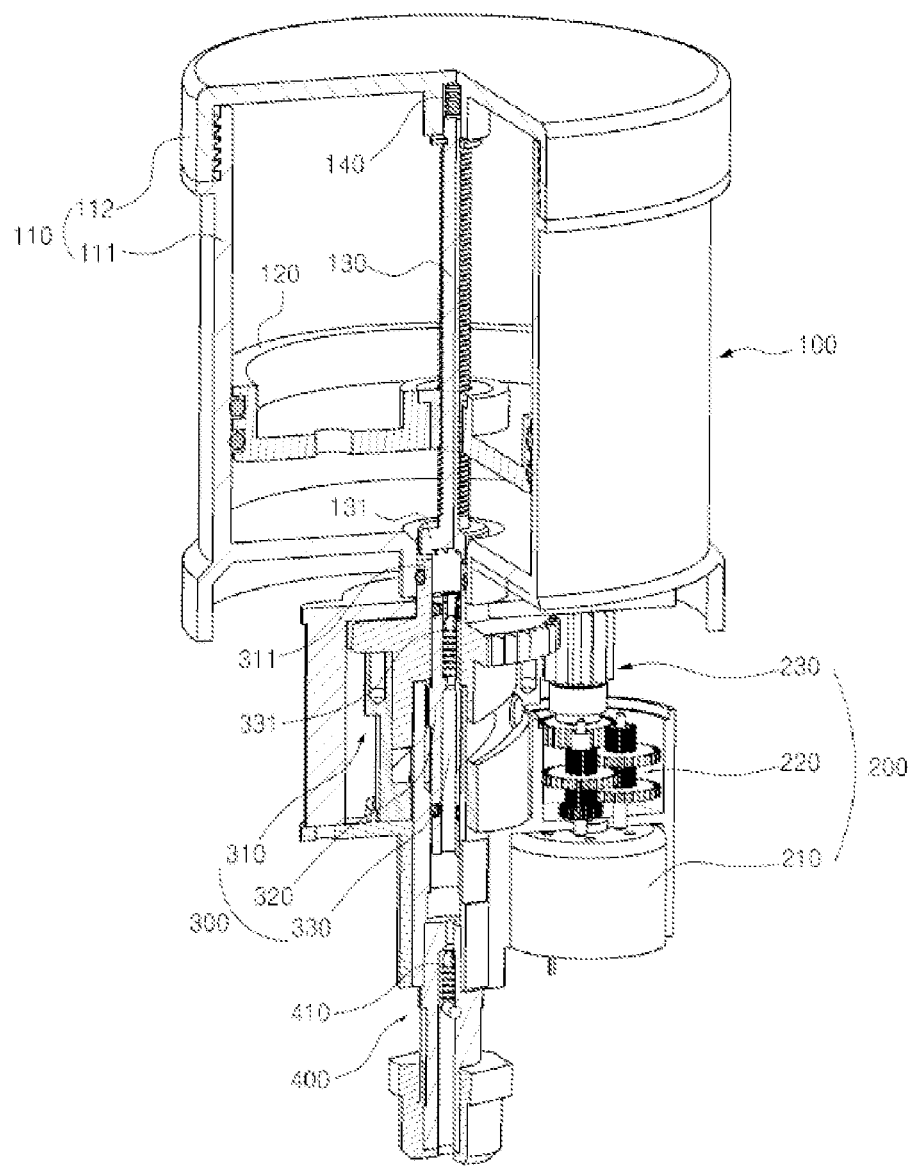
FIG. 1 is a cross-sectional view showing a conventional lubricant injector.
Figure 2:
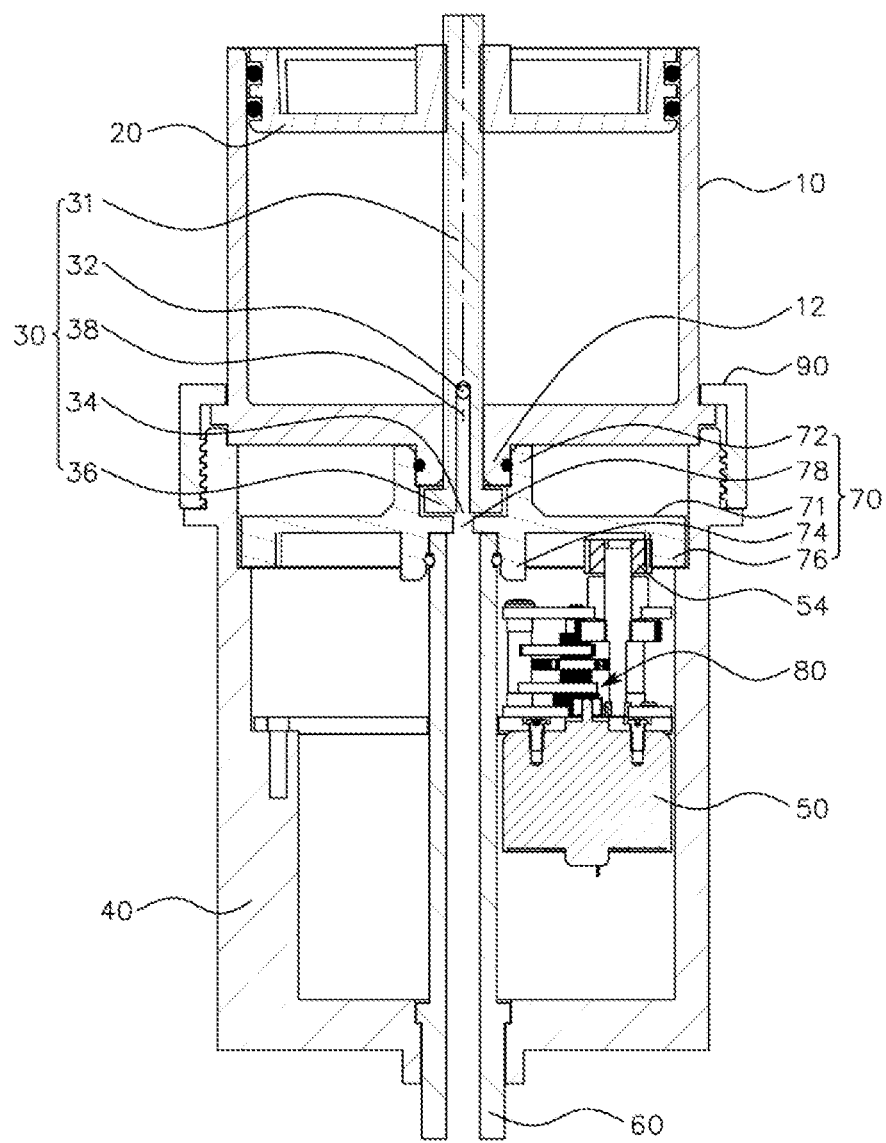
FIG. 2 is a cross-sectional view showing a lubricant injector according to a preferred embodiment of the present disclosure.
Figure 3:
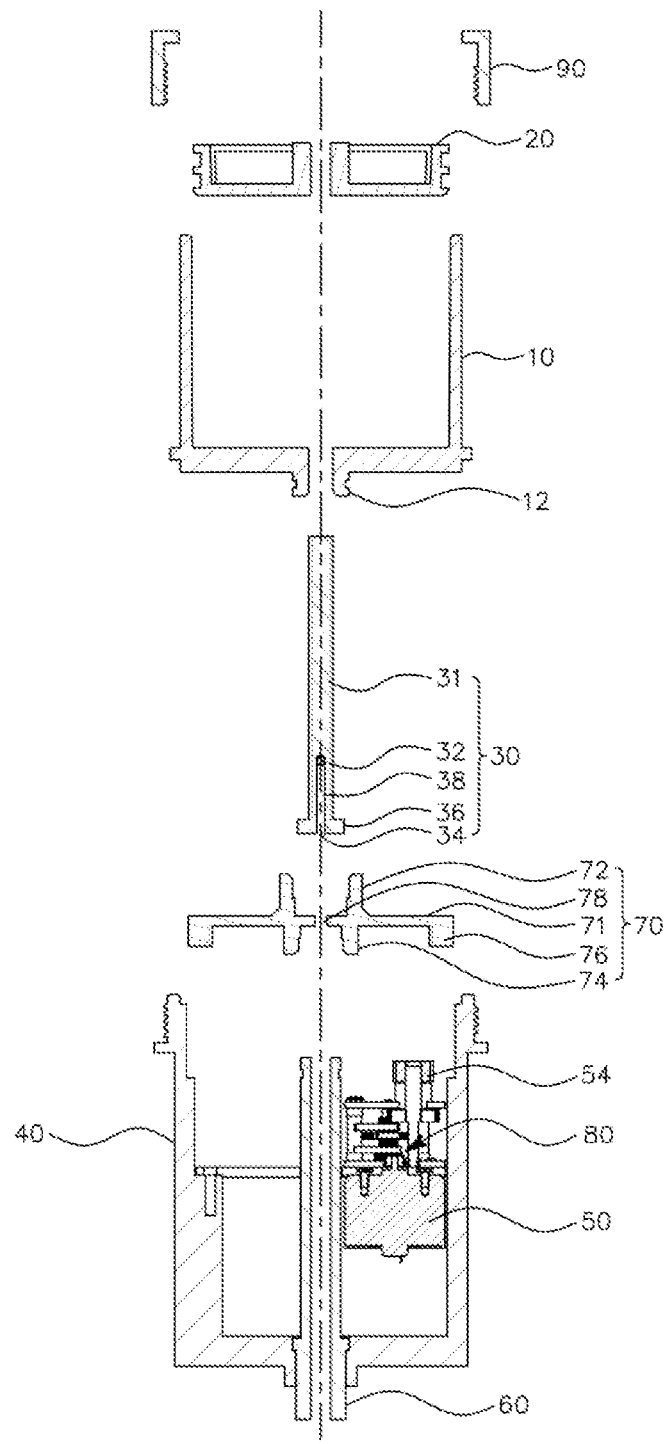
FIG. 3 is a cross-sectional view showing the separation and assembly of a lubricant injector according to a preferred embodiment of the present disclosure.
Figure 4:
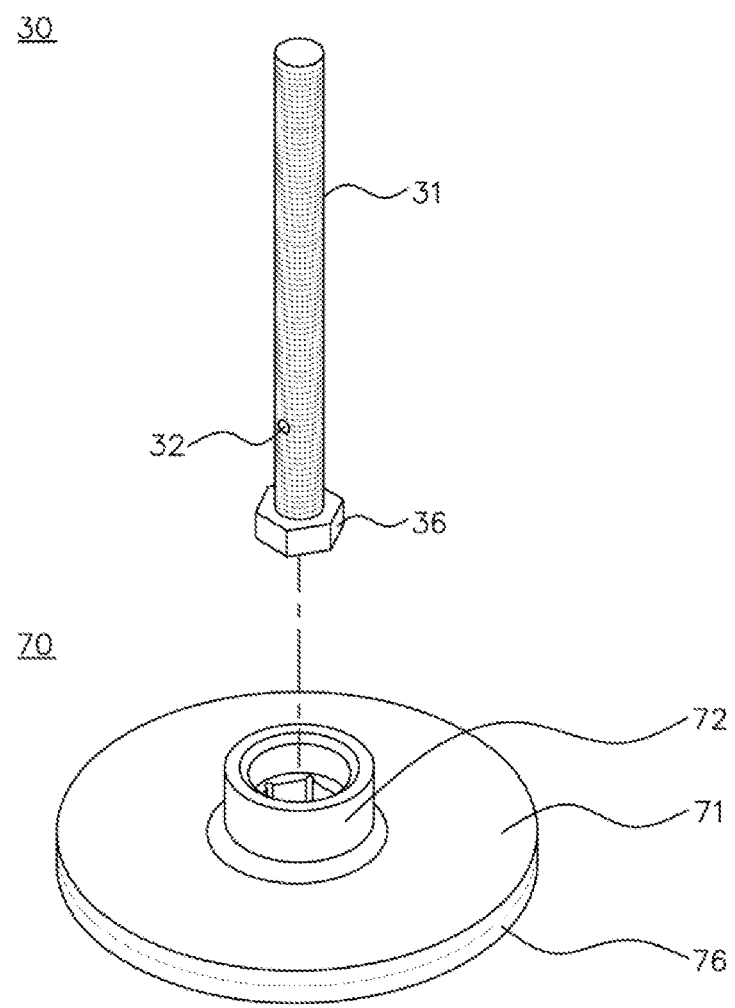
FIG. 4 is a perspective view showing the separation and assembly of a screw shaft and a power transmission member according to a preferred embodiment of the present disclosure.

FIG. 2 is a cross-sectional view showing a lubricant injector according to a preferred embodiment of the present disclosure, FIG. 3 is a cross-sectional view showing the separation and assembly of a lubricant injector according to a preferred embodiment of the present disclosure, and FIG. 4 is a perspective view showing the separation and assembly of a screw shaft and a power transmission member according to a preferred embodiment of the present disclosure.

As shown in FIGS. 2 and 3, the present disclosure is largely composed of a storage chamber 10, a piston 20, a screw shaft 30, a main body 40, a drive motor 50, and a discharge conduit 60.

The storage chamber 10 is intended to provide a space in which lubricating oil is filled, and is located on the upper side of the lubricant injector according to the present disclosure.

The piston 20 is provided inside the storage chamber 10, and piston 20 is screw-coupled with the screw shaft 30, so that the piston 20 may be raised and lowered within the storage chamber 10 as the screw shaft 30 rotates.

An insertion duct 12 coupled to an upper coupler, which will be described later, is further provided on the lower surface of the storage chamber 10.

The main body 40 is located in the lower part of the storage chamber 10. The main body 40 is provided with the drive motor 50 that drives the screw shaft 30, and the discharge conduit 60 for discharging the lubricating oil to the outside.

Meanwhile, according to a preferred embodiment of the present disclosure, as shown in FIG. 4, the screw shaft 30 is provided with a body portion 31 having a thread formed thereon, and a head portion 36 at the lower end thereof. The screw shaft 30 is also provided with an inlet hole 32 on the lower side thereof and an outlet hole 34 (see FIG. 3) on the bottom of the head portion 36.

In this case, as shown in FIGS. 2 and 3, since the body portion 31 is rotatably mounted through the storage chamber 10, and the inlet hole 32 and the outlet hole 34 are in communication with each other through an internal flow passage 38, when the lubricant injector operates, as the piston 20 descends, the pressurized lubricating oil flows into the inlet hole 32 and then flows out through the internal flow passage 38 and out through the outlet hole 34.

The lubricant injector according to the preferred embodiment of the present disclosure further includes a power transmission member 70 that is located between the screw shaft 30 and the discharge conduit 60 to transmit the rotational force of the drive motor 50 to the screw shaft 30.

At this time, the power transmission member 70 includes: a circular plate 71; an upper coupler 72 at the center of the upper surface of the circular plate; a lower coupler 74 at the center of the lower surface of the circular plate; and a ring gear 76 on the bottom surface of the edge of the circular plate. At the center of the circular plate, a through hole 78 is formed that penetrates the upper coupler 72 and the lower coupler 74.

As shown in FIG. 4, the upper coupler 72 is intended to be fixedly coupled with the head portion 36 of the screw shaft 30 inserted therein. To this end, it is preferable that the head portion 36 is provided in a polygonal shape or a sawtooth shape, and the upper coupler 72 fixedly coupled to the head portion is provided in a corresponding shape.

That is, when the head portion 36 has a polygonal shape such as a triangle or square, and the upper coupler 72 into which the head portion 36 is inserted is also shaped to correspond to this shape, the head portion 36 may be inserted and fixed into the upper coupler 72 and rotated as a whole.

When the head portion 36 is shaped into a circle and teeth are formed on the edge thereof, and the upper coupler 72 into which the head portion 36 is inserted is also formed with teeth correspondingly, the head portion 36 may be inserted and fixed into the upper coupler 72 and rotated as a whole.

Meanwhile, as shown in FIG. 2, the ring gear 76 with gear teeth formed on the inside thereof is provided on the lower edge of the circular plate 71. The ring gear 76 is injection molded integrally with the circular plate 71, but may be formed separately and detachably coupled to the circular plate 71 using screws, etc.

When the ring gear 76 is detachably coupled like this, in case the ring gear is worn, the ring gear 76 may be easily replaced by separating the ring gear 76 from the circular plate 71. When all components such as the ring gear 76 and the circular plate 71, as well as the upper coupler 72 and the lower coupler 74, are injection molded as one piece, the production cost decreases.

The ring gear 76 is rotated by a pinion 54 linked to the drive motor, which will be described later, and as a result, the circular plate 71 may also be rotated.

The lower coupler 74 is inserted into the upper side of the discharge conduit 60 and rotatably coupled, and for this purpose, the lower coupler 74 is preferably formed to correspond to the shape of the discharge conduit 60.

Thus, according to the lubricant injector of the present disclosure, by providing the ring gear 76 at the edge of the circular plate 71 so as to rotate by means of the pinion 54, and allowing the screw shaft 30 to be fixedly coupled and rotated at the center of the upper surface of the circular plate 71, the screw shaft may be rotated reliably even with a small torque.

Meanwhile, according to a preferred embodiment of the present disclosure, rotational force is transmitted from the drive motor 50 accommodated in the main body 40 through a reducer 80 to the final pinion 54, and the drive motor 50 is controlled by electrical signals from a control panel (not shown).

The drive motor 50 is located on one side of the main body 40 in consideration of the discharge conduit 60 located at the center of the main body 40, and the reducer 80 is located above the drive motor 50 and transmits rotational force to the final pinion 54 at an appropriate reduction ratio. As a result, the power transmission member 70 is rotatably coupled by the pinion 54 interlocked with the drive motor 50 and may finally transmit rotational force to the screw shaft 30.

Meanwhile, according to a preferred embodiment of the present disclosure, as shown in FIG. 3, after the discharge conduit 60, the drive motor 50, the reducer 80, and the pinion 54 are placed inside the main body 40, the lower coupler 74 on the lower surface of the power transmission member 70 is rotatably coupled to the upper side of the discharge conduit 60, and the head portion 36 of the screw shaft 30 is fixedly coupled to the upper coupler 72.

Next, after the screw shaft 30 is rotatably mounted through the storage chamber 10, the piston 20 is coupled thereto, and finally, the screw shaft 30 is fixed to the main body 40 using the ring-shaped locking member 90 to complete the assembly.

Alternatively, the assembly sequence may be as follows. First, with the screw shaft 30 fastened to the storage chamber 10 and the piston 20, the head portion 36 of the screw shaft 30 is fixedly coupled to the upper coupler 72, and finally, the screw shaft 30 and the main body 40 are fixed to each other by the ring-shaped locking member 90.

In this case, fastening may be easily accomplished because the insertion duct 12 that is coupled to the upper coupler 72 is protruding on the lower surface of the storage chamber 10, and the inner part of the locking member 90 and the upper outer part of the main body 40 are designed to be screwed together, enabling easy fastening just by tightening.

In addition, it is preferable that an O-ring is provided on the outer periphery of the insertion duct 12 to block lubricating oil from escaping through the outlet hole 34 of the screw shaft 30.

The operating process of the lubricant injector of the present disclosure configured as described above will be described in more detail as follows.

As shown in FIG. 2, when the drive motor 50 controlled by the control panel (not shown) rotates, the motor speed is reduced by the reducer 80 to obtain an appropriate reduction ratio and the pinion 54 rotates, and the circular plate 71, that is, the power transmission member 70, also rotates very slowly by the ring gear 76 coupled with the pinion 54.

At this time, because of the head portion 36 fixedly coupled to the upper coupler 72 on the upper surface of the circular plate 71, the screw shaft 30 also rotates at the same speed and as a result, the piston 20 descends due to the rotation of the screw shaft 30.

As the piston 20 descends in this way, the lubricating oil pressurized inside the storage chamber 10 sequentially flows through the inlet hole 32 of the screw shaft 30 to the internal flow passage 38 and the outlet hole 34, and to the through hole 78 formed in the power transmission member 70 and the discharge conduit 60 and be injected into the final destination.

In this case, it is desirable that the inlet hole 32 formed on the lower side of the screw shaft 30 be located at the lowest possible inside of the storage chamber 10 so that the lubricating oil filled in the storage chamber 10 is completely discharged to the last remaining amount.

As described above, the basic technical idea of the present disclosure is to provide a lubricant injector that, by using a ring gear, may slowly rotate a screw shaft by maximally increasing the reduction ratio in an internal space of a provided lubricant injector with a predetermined size, and may strongly rotate the screw shaft to increase ejection pressure.

Furthermore, the basic technical idea of the present disclosure is to provide a lubricant injector that may reliably rotate a screw shaft even with a small rotational force of a pinion by providing a ring gear at the edge of a circular plate to allow the circular plate to rotate by means of the pinion, and by ensuring that the screw shaft is fixedly coupled to the center of the upper surface of the rotating circular plate.

The present disclosure may be modified in various ways by those skilled in the art within the scope of the basic technical idea of the present disclosure.

What is claimed is:

1. A lubricant injector comprising:
   a storage chamber configured to be filled with lubricating oil;
   a piston provided inside the storage chamber;
   a screw shaft that is coupled to the piston, and raises and lowers the piston as the screw shaft rotates;
   a main body located under the storage chamber;
   a drive motor that is accommodated within the main body and drives the screw shaft; and
   a discharge conduit for discharging the lubricating oil to outside,
   wherein the screw shaft has a head portion at a lower end thereof, is rotatably mounted through the storage chamber, and has an inlet hole on a lower side thereof and an outlet hole on a bottom of the head portion, which communicate with each other through an internal flow passage, and
   a power transmission member is provided between the screw shaft and the discharge conduit,
   wherein the power transmission member comprises:
   a circular plate having an upper coupler on an upper surface thereof that is fixedly coupled to the head portion of the screw shaft, and a lower coupler on a lower surface thereof that is rotatably coupled to an upper side of the discharge conduit;
   a ring gear provided on a bottom surface of an edge of the circular plate; and
   a through hole passing through the upper coupler and the lower coupler, and
   the power transmission member is rotatably coupled by a pinion linked to the drive motor to transmit rotational force to the screw shaft.

2. The lubricant injector of claim 1, further comprising:
   an insertion duct, on a lower surface of the storage chamber, coupled to the upper coupler.

3. The lubricant injector of claim 1, wherein the head portion is provided in a polygonal shape or sawtooth shape, and the upper coupler fixedly coupled to the head portion is provided in a corresponding shape.

4. The lubricant injector of claim 1, wherein the ring gear is detachably coupled to the circular plate or is injection molded integrally with the circular plate.

5. The lubricant injector of claim 1, further comprising:
   a ring-shaped locking member configured to secure the storage chamber and the main body to each other.

\* \* \* \* \*